United States Patent
Higashitani (10) Patent No.: US 9,565,331 B2
(45) Date of Patent: Feb. 7, 2017

(54) ADJUSTMENT FOR AUTOMATIC DOCUMENT SHEET READING WITH IMAGE READING DEVICE

(71) Applicant: KYOCERA Document Solutions Inc., Osaka-shi, Osaka (JP)

(72) Inventor: Masahiro Higashitani, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/836,765

(22) Filed: Aug. 26, 2015

(65) Prior Publication Data

US 2016/0065755 A1   Mar. 3, 2016

(30) Foreign Application Priority Data

Aug. 28, 2014   (JP) .................................. 2014-174559

(51) Int. Cl.
    *H04N 1/10*   (2006.01)
    *H04N 1/00*   (2006.01)

(52) U.S. Cl.
    CPC ........ *H04N 1/1065* (2013.01); *H04N 1/00551* (2013.01); *H04N 1/00557* (2013.01)

(58) Field of Classification Search
None
See application file for complete search history.

(56) References Cited

U.S. PATENT DOCUMENTS 8,035,869 B2 * 10/2011 Osakabe ............ H04N 1/00559
    358/471

8,482,824 B2 * 7/2013 Nagasaka .......... H04N 1/40056
    358/484
9,270,856 B2 * 2/2016 Niimura ............... H04N 1/1017

FOREIGN PATENT DOCUMENTS

| JP | S61150350 U | 9/1986 |
|---|---|---|
| JP | H0264944 U | 5/1990 |
| JP | 2001235814 A | 8/2001 |
| JP | 2009086215 A | 4/2009 |

OTHER PUBLICATIONS

Machine translation of Japanese Pub. 2001-235814 to Takahashi, published Aug. 2001.*

(Continued)

*Primary Examiner* — Paul F Payer
(74) *Attorney, Agent, or Firm* — Alleman Hall McCoy Russell & Tuttle LLP (57) ABSTRACT

An image reading device includes transparent plate member, reading portion, support member, and adjustment mechanism. The transparent plate member is an elongated plate extending in a second direction perpendicular to a first direction, and is in contact with a reading surface of a document sheet when the document sheet is moved in the first direction during an automatic document sheet reading. The reading portion is disposed below the transparent plate member. The support member supports a lower surface of the transparent plate member at two support points separated in the second direction. The adjustment mechanism biases an extension end portion, extending outward from one of the support points, of the support member in a downward direction opposite to the supporting direction of the support member, and adjusts a distance between the transparent plate member and the reading portion by changing a biasing force applied to the extension end portion.

5 Claims, 7 Drawing Sheets

(56) References Cited

OTHER PUBLICATIONS

Machine translation of Japanese Pub. 2001-1203841 to Arita, published Jul. 2001.*
Machine translation of Japanese Pub. H08-228266 to Yamahata et al., published Sep. 1996.*

* cited by examiner

ADJUSTMENT FOR AUTOMATIC DOCUMENT SHEET READING WITH IMAGE READING DEVICE

INCORPORATION BY REFERENCE

This application is based upon and claims the benefit of priority from the corresponding Japanese Patent Application No. 2014-174559 filed on Aug. 28, 2014, the entire contents of which are incorporated herein by reference.

BACKGROUND

The present disclosure relates to an image reading device having an automatic document sheet reading function, and in particular relates to an adjustment mechanism and an adjustment method for adjusting a distance between a transparent plate member and a reading portion, wherein the transparent plate member is an elongated plate and is in contact with a reading surface of the document sheet when the document sheet is moved during an automatic document sheet reading.

The image reading device is provided with a reading portion that includes a reading sensor such as a CIS in which a plurality of imaging elements are arranged in a main scanning direction, a light-emitting element such as an LED that irradiates light toward an imaging target, and optical parts such as a lens and a mirror. Conventionally, in an image reading device having an automatic document sheet reading function, a document sheet is read in such a manner that the reading portion is disposed below a contact member (transparent plate member) that is in the shape of an elongated plate, and then the document sheet is moved in the state where a reading surface of the document sheet faces the upper surface of the contact member. This allows an image on the reading surface to be read while the document sheet is moving.

In addition, the image reading device is provided with a document sheet table glass on which the document sheet is placed such that an image is read from the document sheet in a stationary state. As an example of this type of image reading device, there is known a device in which the document sheet table glass is supported in such a manner that the height of the center of the document sheet table glass between support points can be adjusted by adjustment screws.

SUMMARY

An image reading device according to an aspect of the present disclosure includes a transparent plate member, a reading portion, a support member, and an adjustment mechanism. The transparent plate member is an elongated plate extending in a second direction perpendicular to a first direction, and is in contact with a reading surface of a document sheet when the document sheet is moved in the first direction during an automatic document sheet reading. The reading portion is disposed below the transparent plate member. The support member supports a lower surface of the transparent plate member at two support points that are separated from each other in the second direction. The adjustment mechanism is configured to bias an extension end portion of the support member in a downward direction opposite to a direction in which the transparent plate member is supported by the support member, wherein the extension end portion extends outward from one of the two support points. The adjustment mechanism is also configured to adjust a distance between the transparent plate member and the reading portion by changing a biasing force applied to the extension end portion of the support member.

An adjustment method according to another aspect of the present disclosure is a method applied to the image reading device. The image reading device includes a cover portion covering an upper surface of the extension end portion. The adjustment mechanism includes a disk member and a rotation shaft. The disk member is configured to be inserted through the opening of the cover portion such that an outer rim portion of the disk member abuts on the upper surface of the extension end portion. The rotation shaft rotationally supports the disk member at a position deviated from a center of the disk member in a radial direction. This allows the adjustment mechanism to adjust the distance by displacing the extension end portion downward by abutting on the upper surface of the extension end portion through the opening and changing the amount of downward displacement of the extension end portion. The image reading device further includes a drive portion and an adjustment control portion. The drive portion is configured to supply the driving force to the rotation shaft. The adjustment control portion is configured to adjust the distance by controlling the amount of downward displacement of the extension end portion by driving the drive portion. In the image reading device configured as such, the adjustment method adjusts the distance by controlling the amount of downward displacement of the extension end portion by driving the drive portion until a measured value of a predetermined evaluation value is within a predetermined allowable range, wherein the measured value is obtained from an adjustment image read in the automatic document sheet reading.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

First Embodiment

The following describes the first embodiment of the present disclosure with reference to the attached drawings. It should be noted that the following description is an example of a specific embodiment of the present disclosure and should not limit the technical scope of the present disclosure.

Figure 1:
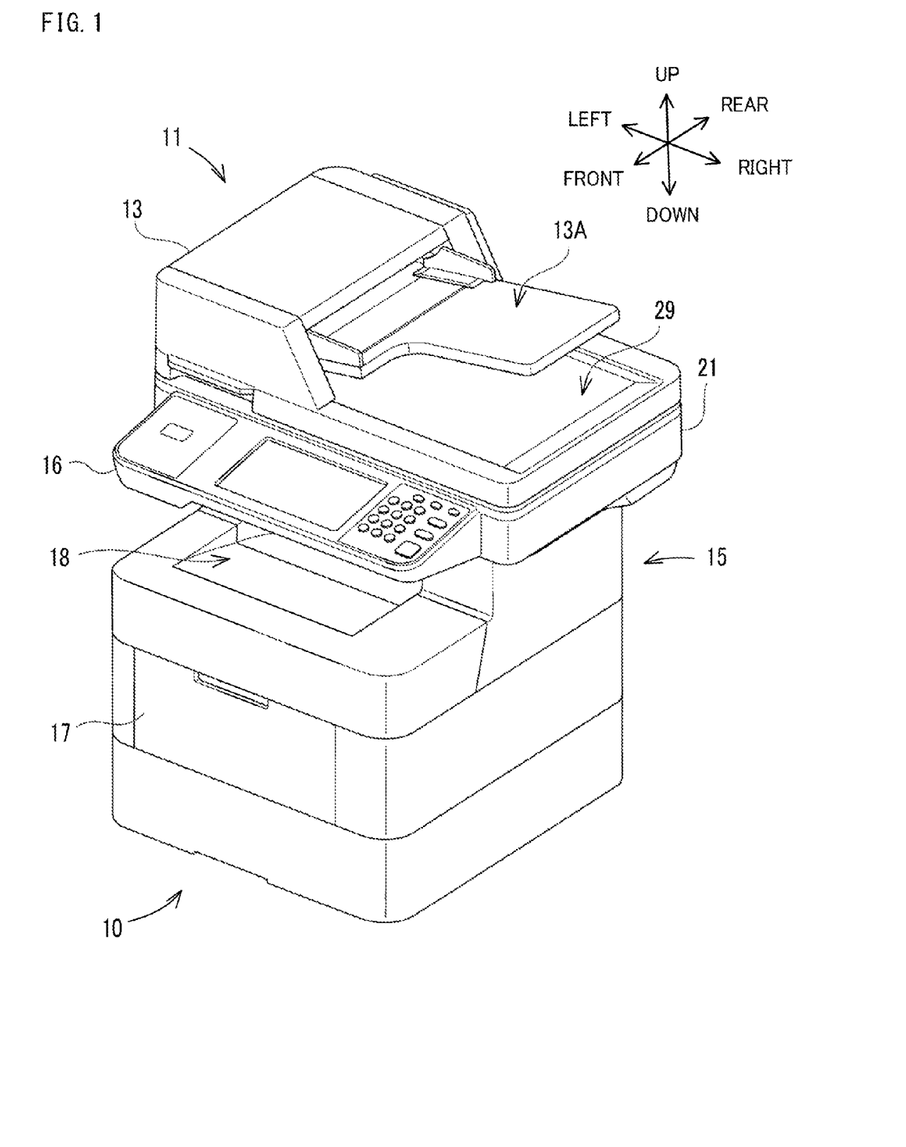
FIG. 1 is a perspective view of an image forming apparatus including an image reading device according to an embodiment of the present disclosure.

First, outlined configurations of an image reading device 11 according to the embodiment of the present disclosure and an image forming apparatus 10 including the image reading device 11 are described with reference to FIG. 1 and FIG. 2. The image forming apparatus 10 is a multifunction peripheral having a plurality of functions such as an image reading function, a facsimile function, and an image forming function. As shown in FIG. 1, the image forming apparatus 10 includes an image reading device 11, an ADF (Auto Document Feeder) 13, an image forming portion 15, an operation display portion 16, a sheet feed cassette 17, and a sheet discharge portion 18. It is noted that in the present embodiment, the image forming apparatus 10 including the image reading device 11, which is an example of the image reading device according to the present disclosure, is explained as one example. However, the present disclosure is not limited to the image forming apparatus 10. For example, the present disclosure may be the image reading device 11 that is independent of the image forming apparatus 10, or may be a facsimile apparatus or a copier that includes the image reading device 11.

The image forming portion 15 executes an image forming process (print process) for forming a color or monochrome image by the electrophotography based on image data which has been read by the image reading device 11 or image data input from an external information processing apparatus such as a personal computer. The image forming portion 15 includes an image forming unit, an exposure device, an intermediate transfer belt, a secondary transfer roller, and a fixing device. The image forming unit includes a photoconductor drum, a charging device, a developing device, a primary transfer roller, and a cleaning device (all of these are not shown). These components are provided in a housing (not shown) that forms a frame or the like of the image forming portion 15. It is noted that although in the present embodiment, the image forming portion 15 is an electrophotographic image forming portion as one example, the image forming portion 15 is not limited to the electrophotographic image forming portion, but may be an image forming portion adapted to an inkjet recording method or other recording or printing methods.

The ADF 13 is provided in the image reading device 11. The ADF 13 feeds, one by one, a plurality of document sheets placed on a document sheet setting portion 13A, and conveys the document sheets continuously along a conveyance path 12 to an image reading position 122 where the document sheet is read by the image reading device 11. This enables the image reading device 11 to read image data from the document sheets conveyed by the ADF 13. Here, in the conveyance path 12, the document sheet passes a returning portion 121 and the predetermined image reading position 122 in the stated order, wherein the document sheet conveyance direction is reversed at the returning portion 121. The image reading position 122 is a position at which an image is read from the document sheet by the image reading device 11, and is a position to which light is irradiated by a reading unit 22 that is described below. A contact member 28 (an example of the transparent plate member) that is described below is provided on the image reading position 122. In the present embodiment, the document sheet is conveyed along the conveyance path 12 such that it is moved along a sub scanning direction (the left-right direction in FIG. 2, an example of the first direction) on the upper surface of the contact member 28 while the reading surface of the document sheet is in contact with the upper surface of the contact member 28.

The image reading device 11 is attached to an upper part of the image forming apparatus 10. The image reading device 11 reads image data from the document sheet. As shown in FIG. 2, the image reading device 11 includes a reading unit 22 (an example of the reading portion), a contact member 27, a contact member 28, a document sheet pressing 29, and a housing 21. These components are stored inside the housing 21 of the image reading device 11. In addition, the image reading device 11 includes a control portion 50 that includes arithmetic elements such as CPU, ROM, and RAM. The control portion 50 comprehensively controls various types of operations including an image reading operation.

The contact member 27 and the contact member 28 are both attached to an upper part of the housing 21. The contact member 27, on which a document sheet as an image-reading target is placed, is held horizontally by the housing 21. The contact member 28, which transmits light irradiated from the reading unit 22 to a document sheet conveyed by the ADF 13, is held horizontally by the housing 21. The contact members 27 and 28 are each formed in the shape of a plate from a transparent resin member.

The contact member 28 is an elongated member extending in a main scanning direction (the front-rear direction in FIG. 1, an example of the second direction), and is a transparent member formed in the shape of a plate. In addition, the width of the contact member 28 is narrow in the sub scanning direction (a direction perpendicular to the main scanning direction). As a result, when the contact member 28 is supported by the housing 21 at two points that are separated from each other in the longitudinal direction, the center portion of the contact member 28 in the longitudinal direction may bend downward due to its own weight. The contact member 28 made of a resin member is lower in strength than the contact member 28 made of glass. In addition, with regard to the housing 21 that supports the contact member 28, the housing 21 made of a resin member is lower in support strength than the housing 21 made of a metal. As a result, due to the reduced strength of the contact member 28 and the housing 21, the contact member 28 is likely to bend. In addition, the contact member 28 may be inclined by a small angle from the horizontal direction due to the dimensional tolerance, the assembling error or other reasons. The bending and inclination of the contact member 28 are factors that inhibit the distance between the reading unit 22 and the contact member 28, more accurately the distance between an imaging element 227 and the contact member 28, from being within an allowable range. Here, the allowable range of the distance is determined based on the focal depth of the imaging element 227 to assure the reading resolution, and varies depending on the type, performance and the like of the imaging element 227. When the distance is not within the allowable range, the image read by the ADF 13 and the reading unit 22 is blurred. In other words, when an image is obtained from the imaging element 227 when the distance is not within the allowable range, the obtained image does not have a sufficient resolution and is blurred. In the present embodiment, for the purpose of preventing such an image blurring from occurring, an adjustment mechanism 90 that can adjust the distance to be within the allowable range is provided. The adjustment mechanism 90 is described below.

Figure 2:
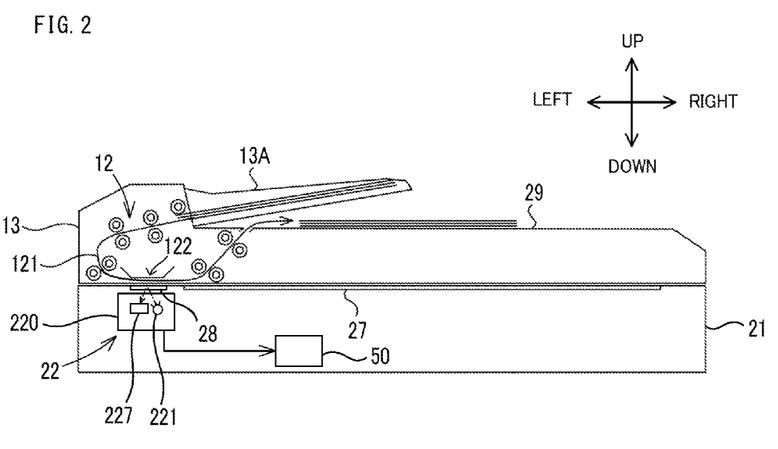
FIG. 2 is a diagram showing an internal configuration of the image reading device according to an embodiment of the present disclosure.

As shown in FIG. 2, the reading unit 22 is a device for reading an image from a document sheet conveyed by the ADF 13, or from a document sheet placed on the contact member 28. The reading unit 22 includes a light source 221 and the imaging element 227. These optical members are stored in a carriage 220 that constitutes a frame of the reading unit 22.

The light source 221 includes a large number of white LEDs that are arranged along the main scanning direction. The imaging element 227 is an image sensor including a photoelectric conversion element. Specifically, the imaging element 227 is a CIS. As described above, the distance between the imaging element 227 and the contact member 28 needs to be kept within a predetermined allowable range. In particular, CIS has a shallower focal depth than CCD. As a result, when the CIS is adopted, the distance needs to be adjusted with high accuracy.

The carriage 220 of the reading unit 22 is configured to be moved in the sub scanning direction by a well-known moving mechanism using a drive device such as a stepping motor. The moving mechanism may be, for example, a belt transmission mechanism or a gear transmission mechanism that transmits the driving force from the motor to the carriage 220. In the image reading device 11, in the state where a document sheet is placed on the contact member 27 and the document sheet pressing 29 is closed, the reading unit 22 is moved inside the housing 21 in the sub scanning direction by the drive device with respect to the document sheet. While the reading unit 22 is moving, the light irradiated from the light source 221 to the contact member 27 is scanned in the sub scanning direction, and reflection light thereof is received by the imaging element 227. In this way, the image is read from the document sheet.

In addition, in the image reading device 11, when an image is read from a document sheet conveyed by the ADF 13, the reading unit 22 is moved to a position where the light from the light source 221 is irradiated onto the contact member 28, namely, moved to below the contact member 28. While the document sheet is being conveyed while being in contact with the upper surface of the contact member 28, light is irradiated from the light source 221 of the reading unit 22 to the contact member 28, and reflection light thereof is received by the imaging element 227. In this way, the image is read from the document sheet.

The imaging element 227 inputs an electric signal which is based on the reflection light, to the control portion 50 as image data of the document sheet. The control portion 50 recognizes the electric signal as the image data.

In the following, a description is given of the housing 21 and the adjustment mechanism 90 with reference to FIG. 3-FIG. 5B.

Figure 3:
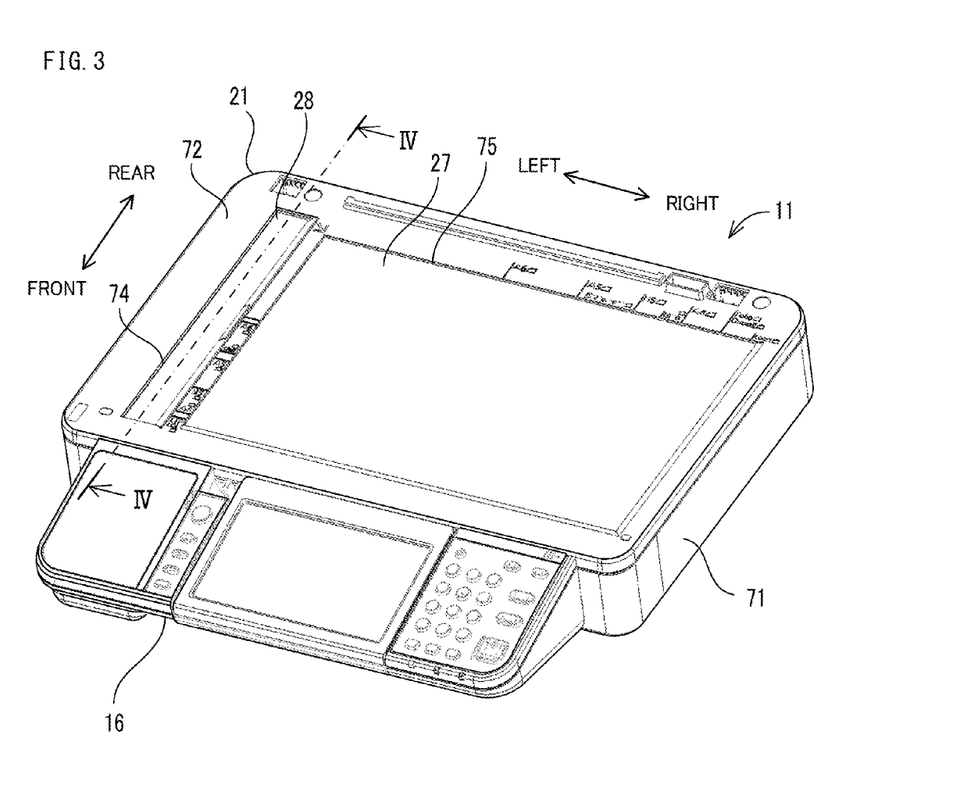
FIG. 3 is a perspective view of the image reading device according to an embodiment of the present disclosure.

As shown in FIG. 3, the housing 21 constitutes an exterior panel, an internal fram and the like of the image reading device 11. The housing 21 is coupled with the upper part of the image forming portion 15 (see FIG. 1). The housing 21 may constitute a part of the housing of the image forming apparatus 10 by being attached to the image forming portion 15 or the like.

Figure 4:
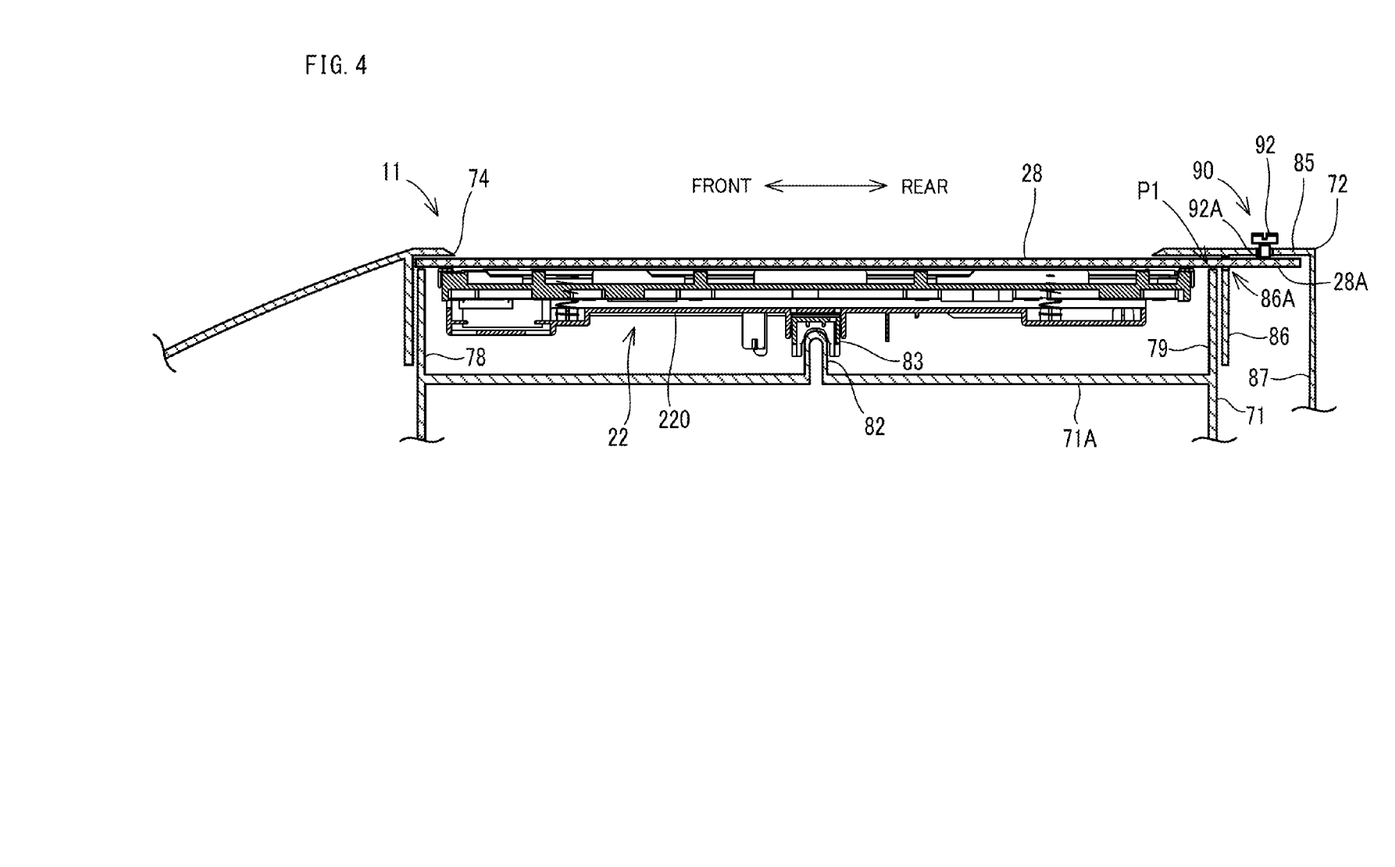
FIG. 4 is a perspective view showing an internal configuration of a housing of the image reading device according to an embodiment of the present disclosure.

As shown in FIG. 3, the housing 21 includes a lower frame 71 and an upper frame 72. The lower frame 71 and the upper frame 72 are molded products made of synthetic resin. The lower frame 71 constitutes a part of the bottom surface and side surfaces of the housing 21. As shown in FIG. 4, the reading unit 22 is stored in the lower frame 71 so as to be movable in the sub scanning direction.

As shown in FIG. 3, the upper frame 72 is formed in the shape of a rectangle that is long in the left-right direction in correspondence with the shape of the lower frame 71. The upper frame 72 is attached to an upper part of the lower frame 71 so as to cover an upper opening of the lower frame 71.

The upper frame 72 includes two openings 74 and 75 that are separate from each other in the left-right direction. The contact member 28 is attached to an outer circumferential edge of the opening 74 on the left. The contact member 27 is attached to an outer circumferential edge of the opening 75 on the right. Specifically, the contact members 27 and 28 are joined to the lower surfaces of outer circumferential edges of the openings 74 and 75 by adhesive member such as double-sided tape. In addition, the lower surfaces of the contact members 27 and 28 are supported from below by support ribs 78 and 79 (an example of the support member) that are described below. In that state, the upper frame 72 is attached to the lower frame 71. This allows the contact members 27 and 28 to be sandwiched by the support ribs 78 and 79 of the upper frame 72 and the lower frame 71 in the up-down direction, and fixed thereto.

FIG. 4 is a cross-sectional view taken along a cut line IV-IV that extends in the front-rear direction passing through the contact member 28 in FIG. 3. As shown in FIG. 4, the lower frame 71 is provided with a support rail 82 that projects upward. A base frame 71A that is a horizontal flat plate, is provided inside the lower frame 71, and the support rail 82 is provided on the upper surface of the base frame 71A. The support rail 82 extends in the sub scanning direction. The lower surface of the carriage 220 of the reading unit 22 is provided with a guide groove 83 that is fitted on and supported by the support rail 82. The reading unit 22 is supported by the guide groove 83 and the support rail 82 so as to be movable in the sub scanning direction.

The support ribs 78 and 79 are provided at opposite ends of the base frame 71A in the front-rear direction. The support rib 78 projects upward from the front end of the base frame 71A. The support rib 79 projects upward from the rear end of the base frame 71A. Opposite ends of the contact member 28 in the longitudinal direction are supported from below by the support ribs 78 and 79. As shown in FIG. 4, in the present embodiment, the front end of the contact member 28 is supported by the upper end of the support rib 78. On the other hand, the rear end portion of the contact member 28 is supported by the upper end of the support rib 79 at a support point P1 that is positioned on the front side by a slight distance from the rear end edge. That is, the contact member 28 has an extension end portion 28A that extends from the support point P1, at which it is supported by the second coupling portion 79, toward the rear side (outward).

As shown in FIG. 4, the upper frame 72 is attached to the lower frame 71 so as to cover the upper opening of the lower frame 71. In the present embodiment, the upper frame 72 is larger than the lower frame 71 in the rear side, and formed in a shape so as to cover the extension end portion 28A that protrudes from the support rib 79 toward the rear side. Specifically, the upper frame 72 includes a cover portion 85 that covers the upper surface of the extension end portion 28A of the contact member 28. The cover portion 85 covers the rear-end portion of the contact member 28 that includes the extension end portion 28A. Furthermore, the upper frame 72 includes two side plates, side plates 86 and 87, that extend downward from the lower surface of the cover portion 85. The side plate 86 is disposed on the rear side of the support rib 79, and the side plate 87 is disposed on the rear side of the rear end edge of the extension end portion 28A. That is, the extension end portion 28A is disposed between the side plate 86 and the side plate 87. The side plate 86 has an opening 86A. The opening 86A is formed in a base end portion of the side plate 86 on the cover portion 85 side. The extension end portion 28A extends toward the rear side by passing through the opening 86A. As a result, the upper surface of the contact member 28 on the rear end side contacts the cover portion 85 in the state where the rear end portion of the contact member 28 is supported by the upper end of the support rib 79. This allows the rear end portion of the contact member 28 to be sandwiched by the support rib 79 and the cover portion 85.

Figure 5A:
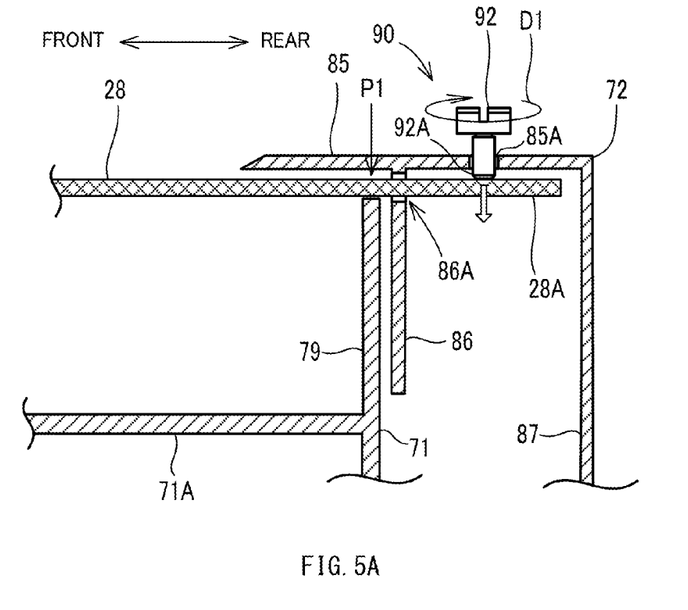
FIG. 5A and FIG. 5B are enlarged views of an adjustment mechanism according to an embodiment of the present disclosure.
Figure 5B:
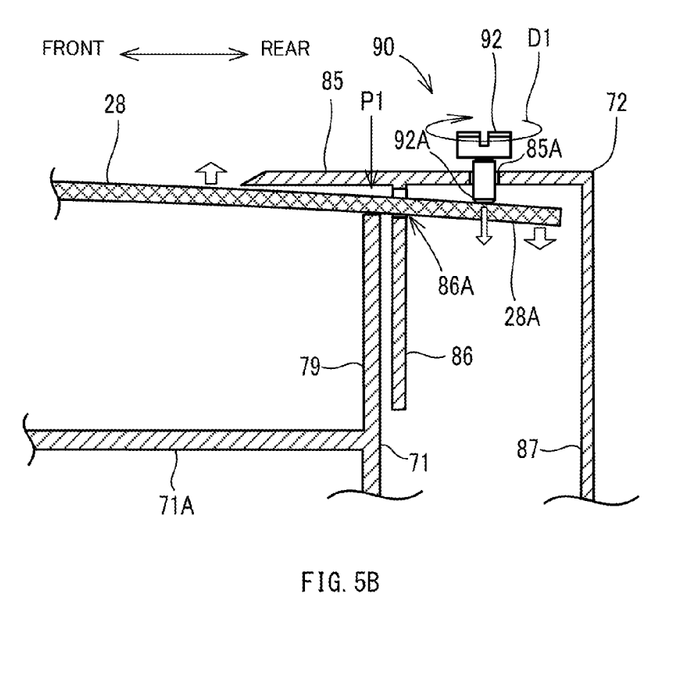

As shown in FIG. 4, FIG. 5A, and FIG. 5B, the adjustment mechanism 90 is provided on the cover portion 85. The adjustment mechanism 90 biases the extension end portion 28A downward, namely in a direction opposite to a direction (upward) in which the extension end portion 28A is supported by the support rib 79, wherein the extension end portion 28A extends from the support point P1 toward the rear side (outward). Furthermore, the adjustment mechanism 90 is configured to adjust the biasing force which it applies when biasing the extension end portion 28A downward. More specifically, the adjustment mechanism 90 abuts on the upper surface of the extension end portion 28A through an opening 85A formed in the cover portion 85 and thereby displaces the extension end portion 28A downward. This allows the amount of downward displacement of the extension end portion 28A to change. As a result, it is possible to adjust the distance between the contact member 28 and the imaging element 227 of the reading unit 22 to be within the allowable range.

As shown in FIG. 5A, the adjustment mechanism 90 is composed of an adjustment screw 92 that has been screwed into a screw hole formed in the opening 85A of the cover portion 85. The adjustment screw 92 is, for example, a roulette screw that can be rotated manually by the worker. Of course, the adjustment screw 92 may be a screw that can be rotated with a tool. As shown in FIG. 5A, a tip 92A of the adjustment screw 92 is made to abut on the upper surface of the extension end portion 28A in the state where the adjustment screw 92 is screwed in the screw hole. When, in this state, the adjustment screw 92 is rotated in a direction indicated by the arrow D1 of FIG. 5A, namely, a direction in which the adjustment screw 92 is screwed, the tip 92A presses the extension end portion 28A downward. As shown in FIG. 5B, when the extension end portion 28A is pressed downward, the extension end portion 28A is displaced downward. At this time, the upper end of the support rib 79 (namely, the support point P1) functions as a fulcrum in the principle of lever, the pressure point pressed by the tip 92A functions as an action point in the principle of lever, and a force that pushes up a portion of the contact member 28 on the front side of the support point P1, acts on the contact member 28. It is noted that although FIG. 5B shows, for the sake of understanding, a state where the front-side portion of the contact member 28 is pushed up, in the actuality, instead of such a state, the center portion of the contact member 28 is brought upward from the state of being bent downward to the state of being horizontal.

In the present embodiment, the worker adjusts the distance between the contact member 28 and the imaging element 227 of the reading unit 22 to be within the allowable range by repeating the adjustment work by the adjustment mechanism 90 and the confirmation work of confirming the image quality of the image that is read after the adjustment. Specifically, the worker rotates the adjustment screw 92 of the adjustment mechanism 90 by a predetermined amount, and then sets, on the ADF 13, an adjustment document sheet having a predetermined image thereon and performs an automatic document sheet reading. From the image data read by the automatic document sheet reading, the CTF (Contrast Transfer Function) is measured with respect to the entire region of the line image in the main scanning direction. Here, the adjustment document sheet has a stripe image composed of white and black lines that are different in thickness. The stripe image is formed over the entire region along the width direction. The CTF is an evaluation value (index) that is used to check the reading resolution, and is represented as follows, wherein Dmax denotes the line density of the black lines of the stripe image, and Dmin denotes the line density of the white lines.

$$CTF = \frac{D\max - D\min}{D\max + D\min} \times 100 \qquad \text{[Equation 1]}$$

The CTF is measured by a dedicated analysis device when it analyzes the read image data. The worker determines whether or not a measured value of the CTF is within the allowable range; ends the adjustment when the measured value is within the allowable range; and when the measured value is without the allowable range, repeats the adjustment until the measured value is within the allowable range. It is noted that the CTF is an example of the predetermined evaluation value of the present disclosure.

As described above, the adjustment mechanism 90 is provided in the present embodiment so that the distance between the contact member 28 and the imaging element 227 of the reading unit 22 can easily be adjusted to be within the allowable range.

It is noted that although the embodiment shows an example where the side plate 87 is provided on the upper frame 72, the side plate 87 may be omitted. That is, the extension end portion 28A of the contact member 28 may be exposed to the rear side of the upper frame 72.

Second Embodiment

Next, the second embodiment of the present disclosure is described with reference to FIG. 6A and FIG. 6B. An image reading device 11 of the second embodiment includes an adjustment mechanism 100 shown in FIG. 6A instead of the adjustment mechanism 90. It is noted that the same component elements as those described in the first embodiment are assigned the same reference signs, and description thereof is omitted.

Figure 6A:
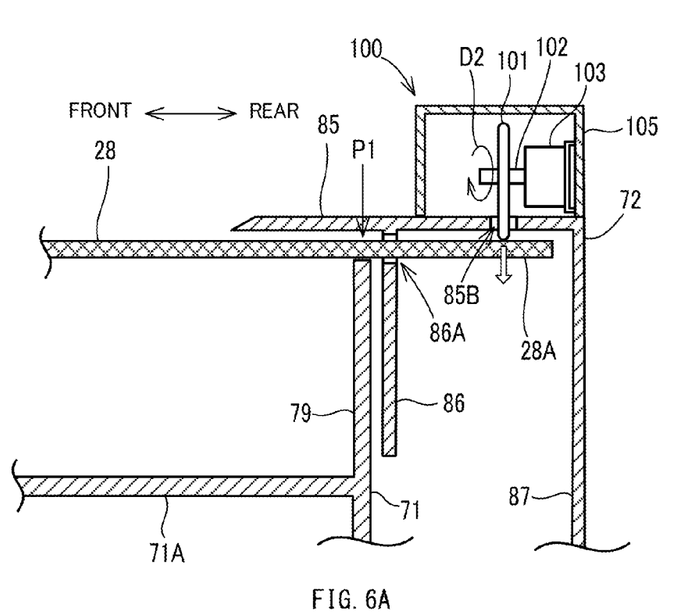
FIG. 6A and FIG. 6B are enlarged views of an adjustment mechanism according to another embodiment of the present disclosure.
Figure 6B:
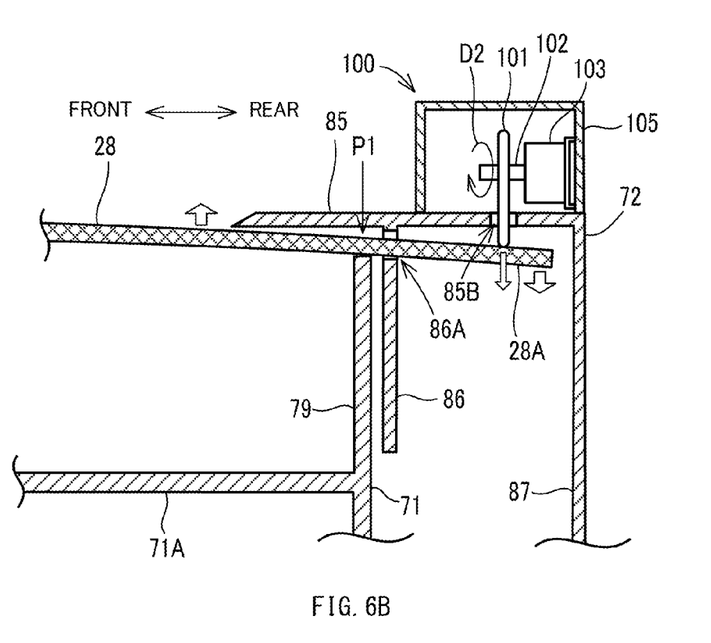

The adjustment mechanism 100 shown in FIG. 6A is, as is the case with the adjustment mechanism 90, provided on the cover portion 85. The adjustment mechanism 100 biases the extension end portion 28A downward and is configured to adjust the biasing force. The adjustment mechanism 100 abuts on the upper surface of the extension end portion 28A through an opening 85B formed in the cover portion 85 and thereby displaces the extension end portion 28A downward. This allows the amount of downward displacement of the extension end portion 28A to change. As a result, it is possible to adjust the distance between the contact member 28 and the imaging element 227 of the reading unit 22 to be within the allowable range.

As shown in FIG. 6A, the adjustment mechanism 100 includes a disk member 101, a rotation shaft 102, and a motor 103 (an example of the drive portion). The disk member 101 is a so-called eccentric cam. The disk member 101 has a shaft hole at a position deviated from the center in the radial direction. The rotation shaft 102 is inserted in the shaft hole and fixed thereto. With this configuration, when the rotation shaft 102 rotates, the member that is in contact with the outer circumferential surface of the disk member 101 is displaced upon receiving the pressure force from the disk member 101. In the present embodiment, a case 105 storing the adjustment mechanism 100 is provided on the upper surface of the cover portion 85. The disk member 101, the rotation shaft 102 and the motor 103 are provided in the case 105. Specifically, the motor 103 is fixed to the rear wall of the case 105, and the rotation shaft 102 as an output shaft is coupled with the motor 103. That is, the motor 103 provides the rotation shaft 102 with a rotational driving force. The rotation shaft 102 extends frontward from the motor 103. The disk member 101 is attached to the rotation shaft 102. With this configuration, the rotation shaft 102 rotationally supports the disk member 101 at a position deviated from the center of the disk member 101 in the radial direction, and transmits the rotational driving force from the motor 103 to the disk member 101, thereby allowing the disk member 101 to rotate.

The disk member 101 is partially inserted through the opening 85B that passes through the cover portion 85. As shown in FIG. 6A, the disk member 101 is configured such that its outer rim portion abuts on the upper surface of the extension end portion 28A in the state where the disk member 101 is inserted through the opening 85B. FIG. 6A shows a state where the outer rim portion of the disk member 101 abuts on the upper surface of the extension end portion 28A. As a result, when the disk member 101 is rotated, the extension end portion 28A receives the pressure force from the outer rim portion thereof, and is pressed downward by the pressure force. That is, when the motor 103 is rotationally driven in the direction indicated by the arrow D2 in FIG. 6A, namely, in the direction of causing the disk member 101 to rotate, in the state where the outer rim portion of the disk member 101 abuts on the upper surface of the extension end portion 28A, the outer rim portion presses the extension end portion 28A downward. At this time, when the disk member 101 is rotated at all times, the pressing force changes depending on the rotation angle, and as a result, the amount of downward displacement of the extension end portion 28A changes. As shown in FIG. 6B, when the extension end portion 28A is pressed downward, the extension end portion 28A is displaced downward. At this time, the upper end of the support rib 79 (namely, the support point P1) functions as a fulcrum in the principle of lever, the pressure point pressed by the outer rim portion functions as an action point in the principle of lever, and a force that pushes up a portion of the contact member 28 on the front side of the support point P1, acts on the contact member 28. It is noted that although FIG. 6B shows, for the sake of understanding, a state where the front-side portion of the contact member 28 is pushed up, in the actuality, instead of such a state, the center portion of the contact member 28 is brought upward from the state of being bent downward to the state of being horizontal.

In the present embodiment, it is possible to adjust the rotation amount of the motor 103 by, for example, on the operation display portion 16, switching the image reading device 11 to the adjustment operation mode and then operating an operation key such as a cross key. In this case, the control portion 50 receives a signal that is input by the operation on the operation display portion 16, drives the motor 103, and controls the amount of downward displacement of the extension end portion 28A so that the distance is within the allowable range. The control portion 50 that drives the motor 103 in this way is an example of the adjustment control portion of the present disclosure.

The worker can rotate the disk member 101 by an arbitrary rotation amount by performing an operation on the operation display portion 16 to rotate the motor 103 by a rotation amount corresponding to the arbitrary rotation amount. This makes it possible to adjust the displacement amount of the extension end portion 28A to an arbitrary amount desired by the worker. In this way, as in the first embodiment, the worker adjusts the distance between the contact member 28 and the imaging element 227 of the reading unit 22 to be within the allowable range by repeating the adjustment work by the adjustment mechanism 100 and the confirmation work of confirming the image quality of the image that is read after the adjustment.

It is noted that in each of the above-described embodiments, the opening/closing of the document sheet pressing 29 may be interrupted due to the presence of the adjustment mechanism 90 or 100 provided on the cover portion 85. In that case, a recessed portion may be provided in the document sheet pressing 29 such that the adjustment mechanism 90 or 100 is embedded in the recessed portion when the document sheet pressing 29 is closed.

In addition, although the above-described embodiments show the adjustment mechanisms 90 and 100 as examples of the adjustment mechanism of the present disclosure, the present disclosure is not limited to these configurations. Any configuration is adoptable as far as it displaces the contact member 28 by biasing the extension end portion 28A of the contact member 28.

Furthermore, the above-described embodiments show examples in which the extension end portion 28A is provided on the rear side of the contact member 28. However, the adjustment mechanisms 90 and 100 are applicable to a case where the extension end portion 28A is provided on the front side of the contact member 28.

Third Embodiment

Next, the third embodiment of the present disclosure is described. The image reading device 11 of the third embodiment is provided with the adjustment mechanism 100 described in the second embodiment, and is configured to automatically adjust the distance with use of the adjustment mechanism 100. It is noted that the difference from the second embodiment is that the control portion 50 performs an adjustment process shown in FIG. 7. In the following, description of configurations common to the second embodiment is omitted, and the adjustment process that is the difference from the second embodiment is described.

Figure 7:
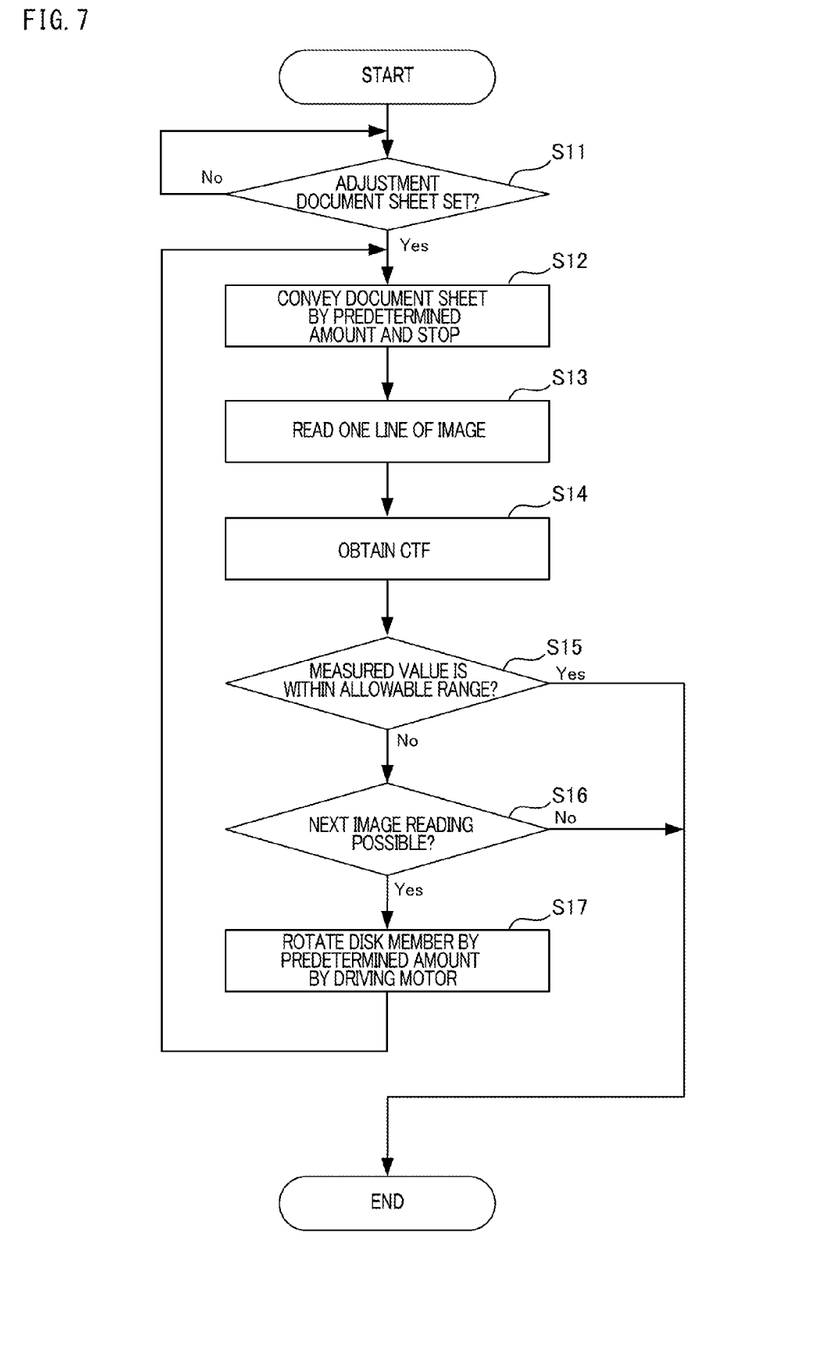
FIG. 7 is a flowchart showing the procedure of an adjustment process executed by a control portion of the present disclosure.

FIG. 7 is a flowchart showing an example of the procedure of the adjustment process executed by the control portion 50. Steps S11, S12, . . . in FIG. 7 represent numbers of the processing procedures (steps). As the processes of the steps are executed, the adjustment process of the present disclosure is embodied by the image reading device 11. It is noted that the processes of the steps are performed as the control portion 50, more specifically the CPU of the control portion 50, executes the program stored in the ROM. Here, the control portion 50 that executes the adjustment process is an example of the adjustment control portion of the present disclosure.

When the image reading device 11 is switched from the normal image reading mode to the adjustment operation mode, the control portion 50 determines whether or not the adjustment document sheet has been set on the document sheet setting portion 13A of the ADF 13 (S11). The determination can be performed based on the output signal of a sheet sensor provided on the document sheet setting portion 13A. When the sheet sensor is not provided, the worker performs a setting completion operation on the operation display portion 16 after setting the adjustment document sheet on the document sheet setting portion 13A. The control portion 50 may determine, based on a signal that is input by the operation, whether or not the adjustment document sheet has been set on the document sheet setting portion 13A.

In the next step S12, the control portion 50 drives the ADF 13 so that the adjustment document sheet is conveyed by a predetermined amount and then stopped. Specifically, the adjustment document sheet is conveyed to a position (the image reading position 122) where the adjustment document sheet can be read by the imaging element 227 of the reading unit 22. In addition, the carriage 220 of the reading unit 22 is moved to below the image reading position 122.

In the next step S13, the control portion 50 reads the image of the adjustment document sheet (adjustment image) by driving the imaging element 227. At this time, since the adjustment document sheet remains stationary, the imaging element 227 reads one line of image. It is noted that when a plurality of columns of imaging elements 227 are arranged in the sub scanning direction, a plurality of lines of images corresponding to the columns are read. In addition, even in the case where the imaging element 227 can read one line of image at a time, it is possible to read lines of images corresponding to a predetermined amount, by conveying the adjustment document sheet by the predetermined amount while the imaging element 227 is operating.

In the next step S14, the control portion 50 obtains a value of the CTF measured from the image that has been read in step S13. Specifically, the control portion 50 transmits the read image data to an external analysis device which is connected to communicate with the image reading device 11. Subsequently, when a value of the CTF that has been measured by the analysis of the analysis device is transmitted, the control portion 50 receives and obtains the value of the CTF. It is noted that when an analysis program to be executed by the analysis device is stored in the ROM of the control portion 50, the control portion 50 may measure the CTF.

In the next step S15, the control portion 50 determines whether or not the value of the CTF obtained in step S14 is within a predetermined allowable range. Data specifying the allowable range is stored in the ROM of the control portion 50. The control portion 50 performs the determination process in step S15 by comparing the obtained value of the CTF with the allowable range stored in the ROM. Here, when the value of the CTF is within the allowable range, the control portion 50 determines that the adjustment process has completed, and ends the series of processes. On the other hand, when the value of the CTF is without the allowable range, the control portion 50 proceeds to the next step S16.

In the next step S16, the control portion 50 determines whether or not image reading is possible if the adjustment document sheet is conveyed by a predetermined amount. For example, the control portion 50 identifies the conveyance position of the adjustment document sheet based on, for example, an output signal from a sheet sensor provided on the conveyance path 12 and an output signal from an encoder that detects the amount of conveyance by the ADF 13, and determines whether or not the adjustment document sheet is on the image reading position 122. Here, upon determining that the image reading is possible, the control portion 50 proceeds to step S17 in which it drives the motor 103 so that the disk member 101 is rotated by a predetermined amount. Subsequently, the control portion 50 returns to step S12, and repeats the processes of step S12 and onward. Subsequently, when step S15 is executed again and the control portion 50 determines that the CTF is within the allowable range, the control portion 50 determines that the adjustment process has completed, and ends the series of processes. On the other hand, upon determining that the CTF is without the allowable range, the control portion 50 executes the process of step S15 again after executing the processes of steps S16 and S17. That is, the control portion 50 repeats the processes of step S12 to step S17 and drives the motor 103 until the value of the CTF obtained from the image of the adjustment document sheet is within the allowable range. In this way, the control portion 50 controls the amount of downward displacement of the extension end portion 28A.

It is noted that when, in step S16, it is determined that the next image reading is not possible, the control portion 50 ends the series of processes while the adjustment is not completed. In this case, the control portion 50 displays, on the operation display portion 16, a message indicating that the adjustment is not completed.

With the above-described execution of the adjustment process by the control portion 50, the worker can easily adjust the distance between the contact member 28 and the reading unit 22 in the image reading device 11. That is, the adjustment process is automatically executed if the device is switched to the adjustment operation mode and the adjustment document sheet is set.

It is noted that in the adjustment process described above, each time the process of step S12 is executed in repetition, the adjustment document sheet is conveyed by a predetermined amount. However, the present disclosure is not limited to this configuration. For example, if the adjustment document sheet is conveyed to the image reading position 122 in step S12 of the first round, the adjustment document sheet may not be conveyed and the image may be read in that state in step S12 of the second round and onward.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
   a transparent plate member configured to be in contact with a reading surface of a document sheet when the document sheet is moved in a first direction during an automatic document sheet reading, the transparent plate member being elongated and extending in a second direction perpendicular to the first direction;
   a reading portion disposed below the transparent plate member;
   a support member supporting a lower surface of the transparent plate member at two support points that are separated from each other in the second direction;
   an adjustment mechanism configured to bias an extension end portion of the support member in a downward direction opposite to a direction in which the transparent plate member is supported by the support member, the extension end portion extending outward from one of the two support points, and to adjust a distance between the transparent plate member and the reading portion by changing a biasing force applied to the extension end portion of the support member; and a cover portion covering an upper surface of the extension end portion, wherein the adjustment mechanism adjusts the distance by displacing the extension end portion downward by abutting on the upper surface of the extension end portion through an opening formed in the cover portion and changing an amount of downward displacement of the extension end portion; and the adjustment mechanism includes a disk member and a rotation shaft, the disk member being inserted through the opening of the cover portion such that an outer rim portion of the disk member abuts on the upper surface of the extension end portion, the rotation shaft rotationally supporting the disk member at a position deviated from a center of the disk member in a radial direction and transmitting a driving force that is input, to the disk member.

2. The image reading device according to claim 1, wherein the adjustment mechanism includes an adjustment screw whose tip abuts on the upper surface of the extension end portion in a state where the adjustment screw has been screwed into a screw hole formed in the opening of the cover portion.

3. The image reading device according to claim 1 further comprising:

a drive portion configured to supply the driving force to the rotation shaft; and an adjustment control portion configured to adjust the distance by controlling the amount of downward displacement of the extension end portion by driving the drive portion.

4. The image reading device according to claim 3, wherein the adjustment control portion controls the amount of downward displacement of the extension end portion by driving the drive portion until a measured value of a predetermined evaluation value is within a predetermined allowable range, the measured value being obtained from an adjustment image read in the automatic document sheet reading.

5. An adjustment method applied to the image reading device according to claim 4 and adjusting the distance by controlling the amount of downward displacement of the extension end portion by driving the drive portion until the measured value of the predetermined evaluation value is within the predetermined allowable range, the measured value being obtained from the adjustment image read in the automatic document sheet reading performed by the image reading device.

* * * * *